3,126,389
ALKOXY-ALKYL-18-EPI-RESERPATES AND
RELATED COMPOUNDS
Michael Mullen Robison, Berkeley Heights, and Robert Armistead Lucas, Mendham, N.J., assignors to Ciba Corporation, a corporation of Delaware
No Drawing. Filed Sept. 22, 1961, Ser. No. 139,883
6 Claims. (Cl. 260—287)

The present invention concerns process for the preparation of $\Delta^3$-allo-yohimbene compounds having the nucleus of the formula

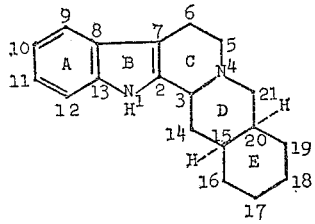

in which a double bond extends from the 3-position. More particularly, it relates to $\Delta^3$-18α-hydroxy-allo-yohimbene 16β-carboxylic acid lower alkoxy-lower alkyl esters, particularly to $\Delta^3$-18α-hydroxy-17α-R-allo-yohimbene 16β-carboxylic acid lower alkoxy-lower alkyl esters, in which R represents primarily lower alkoxy, as well as cyano, and in which lower alkyl separates lower alkoxy from the 16β-carboxyl group by at least two carbon atoms, or salts thereof. Apart from the groups attached to the 16-position, the 17-position and the 18-position, the compounds of the present invention may have additional substituents. Thus, substituents attached to the positions of the aromatic nucleus, i.e. ring A, of the molecule, more specifically to the 9-position, the 10-position, the 11-position and/or the 12-position, are represented, for example, by aliphatic hydrocarbon, such as lower alkyl and the like, etherified hydroxyl, particularly lower alkoxy, as well as cycloalkyloxy, cycloalkyl-lower alkoxy, carbocyclic aryloxy, carbocyclic aryl-lower alkoxy, lower alkylenedioxy and the like, esterified hydroxyl, particularly halogeno, as well as lower alkoxy-carbonyloxy, lower alkanoyloxy and the like, etherified mercapto, such as lower alkylmercapto and the like, nitro, amino, such as N,N-disubstituted amino and the like, substituted aliphatic hydrocarbon, such as substituted lower alkyl, for example, halogeno-lower alkyl, particularly trifluoromethyl, or any other suitable substituent. Other substituents, particularly aliphatic hydrocarbon radicals, such as lower alkyl, may also be attached to positions of other nuclei, particularly of the heterocyclic nucleus C, more specifically to the 5-position and/or the 6-position.

More especially, the invention is directed to the preparation of compounds of the formula

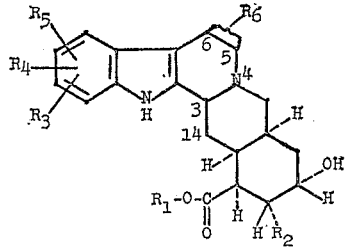

in which $R_1$ represents lower alkoxy-lower alkyl, in which lower alkyl separates lower alkoxy from the 16β-carboxyl group by at least two carbon atoms, $R_2$ stands primarily for lower alkoxy, as well as for cyano, each of the groups $R_3$, $R_4$ and $R_5$ stands for hydrogen, aliphatic hydrocarbon, particularly lower alkyl and the like, substituted aliphatic hydrocarbon, particularly substituted lower alkyl, such as halogeno-lower alkyl, especially trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxy group, esterified hydroxyl, particularly halogeno, as well as lower alkoxy-carbonyloxy, lower alkanoyloxy and the like, etherified mercapto, particularly lower alkyl-mercapto, nitro, amino, e.g. N,N-di-substituted amino and the like, or whenever two of the groups $R_4$, $R_5$ and $R_6$ are attached to two adjacent positions and are taken together, for lower alkylenedioxy, and $R_6$, attached to one of the positions 5 and 6, stands for hydrogen or lower alkyl, and in which a double bond extends from the 3-position, or salts of such compounds, as well as process for the preparation of such compounds.

The lower alkoxy-lower alkyl groups $R_1$, in which lower alkyl separates lower alkoxy from the 16β-carboxyl group, to which $R_1$ is attached, by at least two carbon atoms, may be represented by the group of the formula $$H-(C_yH_{2y})-O-(C_xH_{2x})-$$

in which the letter $x$ represents a whole number from two to three, the letter $y$ stands for a whole number from one to four, and the group of the formula $-(C_xH_{2x})-$ separates the oxygen atom and the carboxyl group to which it is attached by at least two carbon atoms. Lower alkoxy-lower alkyl may, therefore, be represented by 2-lower alkoxy-ethyl, e.g. 2-methoxyethyl, 2-ethoxyethyl, 2-n-propyloxyethyl, 2-isopropyloxyethyl, 2-n-butyloxyethyl and the like, 2-lower alkoxy-propyl, e.g. 2-methoxypropyl and the like, 3-lower alkoxy-propyl, e.g. methoxypropyl, 3-ethoxypropyl and the like.

The substituent attached to the 17α-position, as represented by the group $R_2$ in the above formula, stands for lower alkoxy, which has preferably from one to four carbon atoms, and stands primarily for methoxy, as well as ethoxy, n-propyloxy, isopropyloxy, n-butyloxy, iso-butyloxy and the like. It may also represent cyano.

Substituents attached to any of the positions available for substitution in ring A, particularly those represented by the groups $R_3$, $R_4$ and $R_5$ (each of which may also stand for hydrogen) in the previously-given formula, may be, for example, lower aliphatic hydrocarbon, especially lower alkyl, having preferably from one to four carbon atoms, e.g. methyl, ethyl, n-propyl, isopropyl, n-butyl, isobutyl, secondary butyl, tertiary butyl and the like, or functional groups, such as, for example, etherified hydroxyl, particularly lower alkoxy, having preferably from one to four carbon atoms, e.g. methoxy, ethoxy, n-propyloxy, isopropyloxy, n-butyloxy, isobutyloxy, secondary butyloxy, tertiary butyloxy and the like, as well as lower alkenyloxy, e.g. allyloxy and the like, cycloalkyloxy, in which cycloalkyl has from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly halogeno (representing hydroxyl esterified by a hydrohalic acid), particularly halogeno having an atomic weight of 19 to 80, e.g. fluoro, chloro, bromo and the like, lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto, having preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methyl-amino, N,N-diethyl-amino and the like, polyhalogeno-lower alkyl, particularly trifluoromethyl and the like, or any other suitable functional group. A substituent may also be attached to two adjacent positions of ring A and form a ring fused onto the A-ring; for example, two of the radicals $R_3$, $R_4$ and $R_5$ in the formula, when substituting two neighboring positions and taken together, may also form a fused-on cyclic substituent. Such substituents may be represented, for example, by lower alkylene-dioxy, e.g. methylenedioxy, 1,1-ethylenedioxy and the like, or any other analogous grouping.

Substituents, which may be attached to other positions in the molecule, particularly to positions in ring C available for substitution, are primarily aliphatic hydrocarbon, such as lower alkyl, having preferably from one to four carbon atoms, particularly methyl, as well as ethyl, n-propyl, isopropyl and the like. The radical $R_6$ in the previously given formulae, which stands primarily for hydrogen, may, therefore, also represent lower alkyl, particularly methyl, as well as ethyl and the like.

In the compounds of this invention, the double bond extends from the 3-position to the 14-position whenever the compounds are in the form of the free base or are dissolved in a weakly to non-polar solvent; the double bond extends from the 3-position to the 4-position, when the free base is dissolved in a more polar solvent or whenever the compounds are in the form of their salts. Such salts, particularly pharmaceutically acceptable salts, are those, in which the anion is derived from an acid, primarily an inorganic acid, such as, for example, hydrochloric, hydrobromic, sulfuric, perchloric acid and the like, as well as an organic carboxylic acid, e.g. acetic, maleic, citric, tartaric, acid and the like, or an organic sulfonic acid, e.g. methane sulfonic, e.g. p-toluene sulfonic acid.

We have now found that the compounds of this invention have strong antifibrillatory effects and can be used to overcome cardiac irregularities, such as extrasystoles, auricular filbrillation, or cardiac irregularities caused by aconitine and the like.

Compounds of the above type are primarily the lower alkoxy-lower alkyl 3-dehydro-18-epi-reserpates, in which lower alkyl, having from two to three carbon atoms, separates lower alkoxy from the 16β-carboxyl group by two to three carbon atoms, such as 2-lower alkoxy-ethyl 3-dehydro-18-epi-reserpates, e.g. 2-methoxyethyl 3-dehydro-18 - epi-reserpate, 2-ethoxyethyl 3-dehydro-18-epi-reserpate, 2-n-propyloxyethyl 3-dehydro-18-epi-reserpate, 2-isopropyloxyethyl 3 - dehydro-18-epi-reserpate, and the like, 2-lower alkoxy-propyl 3-dehydro-18-epi-reserpates, e.g. 2-methoxypropyl 3-dehydro-18-epi-reserpate, 2-ethoxypropyl 3-dehydro-18-epi-reserpate and the like, 3-lower alkoxy-propyl 3 - dehydro-18-epi-reserpates, e.g. 3 - methoxypropyl 3-dehydro-18-epi-reserpate, 3-ethoxypropyl 3-dehydro-18-epi-reserpate and the like, or the pharmaceutically acceptable salts thereof, particularly the halides, e.g. chloride, bromide and the like. Other compounds of this group are the lower alkoxy-lower alkyl 3-dehydro-18-epi-deserpidates, in which lower alkyl, having from two to three carbon atoms, separates lower alkoxy from the 16β-carboxyl group by two to three carbon atoms, such as 2-lower alkoxy-ethyl 3-dehydro-18-epi-deserpidates, e.g. 2-methoxyethyl 3-dehydro-18-epi-deserpidate, 2-ethoxyethyl 3-dehydro-18-epi-deserpidate and the like, 2-lower alkoxy-propyl 3-dehydro-18-epi-deserpidates, e.g. 2 - methoxypropyl 3 - dehydro-18-epi-deserpidate and the like, 3-lower alkoxy-propyl 3-dehydro-18-epi-deserpidates, e.g. 3-methoxypropyl 3-dehydro-18-epi-deserpidate and the like, or lower alkoxy-lower alkyl 10-methoxy-3-dehydro-18-epi-deserpidates, in which lower alkyl, having from two to three carbon atoms, separates lower alkoxy from the 16β-carboxyl group by two to three carbon atoms, such as 2-lower alkoxy-ethyl 10-methoxy-3-dehydro-18-epi-deserpidates, e.g. 2 - methoxyethyl 10-methoxy-3-dehydro-18-epi-deserpidate and the like, 2-lower alkoxy-propyl 10-methoxy-3-dehydro-18-epi-deserpidates, e.g. 2 - methoxypropyl 10-methoxy-3-dehydro-18-epi-deserpidate and the like, 3-lower alkoxy-propyl 10-methoxy-3-dehydro-18-epi-deserpidates, e.g. 3-methoxypropyl 10 - methoxy-3-dehydro-18-epi-deserpidate and the like, or the pharmaceutically acceptable salts thereof, such as the halides, e.g. chlorides, bromides and the like, thereof.

These compounds of this invention may be used in the form of pharmecautical preparations, which contain the new compounds in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for pharmacentical preparations. The latter may be in solid form, for example, as capsules, tablets, dragees and the like, or in liquid form, for example, as solutions, suspensions, emulsions, and the like. If desired, they may contain auxiliary substances, such as preserving, stabilizing, wetting, emulsifying agents and the like, salts for varying the osmotic pressure buffers, etc. They may also contain, in combination, other useful substances.

The $\Delta^3$ - 18α - hydroxy-allo-yohimbene 16β-carboxylic acid lower alkoxy-lower alkyl esters of this invention or salts thereof may be prepared according to known methods, for example, by introducing a double bond into the 3-position of an 18α-hydroxy-allo-yohimbane 16β-carboxylic acid lower alkoxy-lower alkyl ester compound, in which lower alkyl separates lower alkoxy from the 16β-carboxyl group by at least two carbon atoms, or a salt thereof, and, if desired, converting a resulting salt into the free compound, and/or, if desired, converting a resulting compound into a salt thereof.

The hydrogen atom attached to the 3-position of the starting material may have either the α-configuration or the β-configuration; the starting material may, therefore, be of the allo-yohimbane or the 3-epi-allo-yohimbane series. Salts of the starting material are primarily acid addition salts, such as those, for example with inorganic acids, e.g. hydrochloric, sulfuric, perchloric acid and the like.

The introduction of a double bond extending from the 3-position may be carried out, for example, by treatment of the starting material with mercuric acetate according to the method described by Weisenborn et al., J. Am. Chem. Soc., vol. 78, p. 2022 (1956), or with tertiary butyl hypochlorite according to the procedure described by Gottfredsen et al., Acta Chem. Scand., vol. 10, p. 1414 (1956), or with palladium black in the presence of acetic acid, as described in United States Patent No. 2,957,000.

We prefer to introduce the double bond into the 3-position of an 18α-hydroxy-allo-yohimbane 16β-carboxylic acid lower alkoxy-lower alkyl ester compound or a salt thereof by treatment of the starting material with an oxidation reagent containing hexavalent chromium. Such reagent is, for example, a salt of chromic acid, such as an alkali metal dichromate, particularly potassium dichromate and the like, as well as ammonium dichromate, or any other analogous salt containing the hexavalent chromium. Also useful as such oxidation reagent is chromic anhydride or any other suitable, analogous oxidation reagent of the above type. These reagents are advantageously used in the presence of an acid, especially acetic acid and the like, which may also serve as a diluent. The reaction is carried out in an aqueous medium, preferably in a mixture of water and water-miscible organic solvents. The latter are diluents, which are not oxidized by the oxidation reagent; suitable solvents are, for example, tetrahydrofuran, p-dioxane, acetone and the like, but preferably acetic acid. The latter, when used as a diluent may also serve as an acidic reagent which may be required whenever the oxidation reagent is used in an unreactive form. The reaction is carried out at room temperature, if necessary, while cooling. The oxidative introduction of the double bond into the 3-position of the starting material by treatment with an oxidation reagent containing hexavalent chromium is carried out at room temperature using a salt of chromic acid, such as an alkali metal dichromate, especially potassium dichromate, as the oxidation reagent, in a mixture of water and a water-miscible organic solvent, especially potassium dichromate, as the oxidation reagent, in a mixture of water and a water-miscible organic solvent, especially in aqueous acetic acid.

The 3-dehydro-compound resulting from the above procedure is preferably isolated by neutralizing or basifying the reaction mixture, thus converting a resulting salt formed in the acidic reaction medium into the free base. Any water-soluble alkaline reagent may be used for that purpose; especially convenient is ammonia in the form of a concentrated aqueous solution thereof. Upon basifying the reaction mixture, the desired compound may precipitate and be filtered off, or it may be extracted from the aqueous medium into an organic, sparingly water-miscible solvent, e.g. methylene chloride, chloroform, diethyl ether and the like, and thus be separated from the reaction mixture.

The starting materials used in the above procedure are known or may be prepared according to known methods. Compounds having an 18α-hydroxyl group may be obtained, for example, by hydrolizing in an 18β-organic sulfonyloxy-allo-yohimbane 16β-carboxylic acid ester compound, in which the hydrogen atom attached to the 3-position has either the α-configuration or the β-configuration, the 18β-organic sulfonyloxy group by treatment with water, preferably in the presence of an organic amine, e.g. N,N,N-triethylamine and the like; details of such hydrolysis are given hereinbelow. Compounds of the 18α-hydroxy-allo-yohimbane 16β-carboxylic acid ester series may be obtained, for example, by isomerization of an 18α-hydroxy-3-epi-allo-yohimbane 16β-carboxylic acid ester compound in an acidic medium and isolating the desired allo-yohimbane compound; such isomerization may be achieved by treatment with an acid, for example, an organic carboxylic acid, particularly an aliphatic hydrocarbon carboxylic acid, such as a lower alkanoic acid, e.g. acetic, propionic acid and the like, primarily glacial acetic acid, an organic sulfonic acid, particularly a carbocyclic aryl sulfonic acid, e.g. p-toluene sulfonic acid and the like, or a lower alkane sulfonic acid, e.g. methane sulfonic acid and the like, or a strong mineral acid, such as a hydrohalic acid, e.g. hydrogen chloride and the like, or a mixture of such acids, according to known methods. The 16β-carboxylic acid ester grouping in an 18α-hydroxy-allo-yohimbane 16β-carboxylic acid ester compound may be converted into the desired 16β-carboxylic acid lower alkoxy-lower alkyl ester group according to known esterification or transesterification procedures.

The Δ³-18α-hydroxy-allo-yohimbene 16β-carboxylic acid lower alkoxy-lower alkyl ester compounds and salts thereof may also be prepared by hydrolizing in aΔ³-18β-organic sulfonyloxy-allo-yohimbene 16β-carboxylic acid lower alkoxy-lower alkyl ester compound, in which lower alkyl separates lower alkoxy from the 16β-carboxyl group by at least two carbon atoms, or a salt thereof the 18β-organic sulfonyloxy group by treatment with water, and, if desired, carrying out the optional steps.

An 18β-organic sulfonyloxy group, in which the hydroxyl group is esterified by an organic sulfonic acid, such as a lower alkane sulfonic acid, e.g. methane sulfonic, ethane sulfonic acid and the like, or, more especially, a monocyclic carbocyclic aryl sulfonic acid, such as, for example, benzene sulfonic, toluene sulfonic acid and the like, but particularly 4-bromo-benzene sulfonic, 4-nitro-benzene sulfonic, 3-nitro-benzene sulfonic acid and the like, may be hydrolized by treatment with water in the absence of an additional reagent. However, it is more preferably performed in the presence of an organic tertiary amine, particularly an aliphatic tertiary amine, such as an N,N,N-tri-lower alkyl-amine, e.g. N,N,N-trimethylamine, N-ethyl-N,N-dimethylamine, N,N-diethyl-N-methylamine, N,N,N-triethylamine and the like, an N,N,N',N'-tetra-lower alkyl-lower alkylene-diamine, e.g. N,N,N',N'-tetramethyl-1,5-pentylene-diamine, N,N,N',N'-tetramethyl-1,6-hexylene-diamine, N,N,N',N' - tetraethyl-1,6-hexylenediamine, N,N,N',N' - tetramethyl - 1,7 - heptylenediamine and the like, or any other suitable aliphatic tertiary amine. Other tertiary amines may also be heterocyclic tertiary bases, e.g. pyridine, collidine and the like, or any other suitable organic tertiary amine.

The hydrolysis, which occurs with inversion at the 18-position, may be carried out in the absence or presence of an additional solvent; suitable inert diluents are, for example, p-dioxane and the like. The reaction is preferably completed at an elevated temperature, desirably in a closed vessel and/or in the atmosphere of an inert gas, such as nitrogen.

The starting materials used in the above procedure may be prepared according to known methods, for example, by treating an 18β-hydroxy-3-oxo-2,3-seco-allo-yohimbane 16β-carboxylic acid lower alkoxy-lower alkyl ester with an organic sulfonic acid halide, e.g. chloride and the like, preferably in the presence of an organic base, e.g. pyridine and the like, and reacting the resulting 18β-organic sulfonyloxy-3-oxo-2,3-seco-allo-yohimbane 16β-carboxylic acid lower alkoxy-lower alkyl ester with a ring closing reagent, e.g. phosphorous oxychloride or any other suitable ring closing reagent. Esterification and ring closure are carried out according to known methods.

The Δ³-18α-hydroxy-allo-yohimbene 16β-carboxylic acid lower alkoxy-lower alkyl ester compounds or salts thereof may also be prepared by hydrolizing in a Δ³-18α-esterified hydroxy-allo-yohimbene 16β-carboxylic acid lower alkoxy-lower alkyl ester, in which lower alkyl separates lower alkoxy by at least two carbon atoms, or a salt thereof, the 18α-esterified hydroxyl group, and, if desired, converting a resulting compound into a salt thereof.

Hydrolysis of the 18α-esterified hydroxyl group, in which the hydroxyl group is esterified by an organic acid, particularly an organic carboxylic acid, such as, for example, an aliphatic carboxylic acid, e.g. acetic, propionic, pivalic acid and the like, a carbocyclic aryl carboxylic acid, e.g. benzoic, 3,4,5-trimethoxybenzoic acid and the like, a carbocyclic aryl-aliphatic carbocyclic acid, e.g. cinnamic, 3,4,5-trimethoxy-cinnamic acid, and the like, a heterocyclic aryl carboxylic acid, e.g. nicotinic acid and the like, or a heterocyclic aryl-aliphatic carboxylic acid, e.g. 2-pyridyl-acetic acid and the like, as well as an organic sulfonic acid, is carried out according to known methods, for example, by treatment with an alkaline reagent. In view of the fact that hydrolysis of the 16β-carboxylic acid lower alkoxy-lower alkyl ester group has to be avoided, hydrolysis of the 18α-esterified hydroxyl group is preferably carried out by treatment with an alkaline transesterification reagent, such as an alkali metal lower alkoxy-lower alkanolate, e.g. sodium or potassium 2-methoxyethanolate, 2-ethoxyethanolate, 2-methoxypropanolate, 3-methoxypropanolate and the like, in the presence of the corresponding lower alkoxy-lower alkanol, e.g. 2-methoxyethanol, 2-ethoxyethanol, 2-methoxypropanol, 3-methoxypropanol and the like, which may also serve as diluent; additional inert solvents, such as p-dioxane and the like, may serve as further diluents.

The starting material used in the above reaction is prepared according to known methods, for example, by hydrolizing in an 18β-organic-sulfonyloxy-3-oxo-2,3-seco-allo-yohimbane 16β-carboxylic acid lower alkoxy-lower alkyl ester, the 18β-organic sulfonyloxy group, by treatment with water, preferably in the presence of an organic tertiary base, e.g. N,N,N-triethylamine and the like, esterifying the free hydroxyl group in a resulting 18α-hydroxy- 3-oxo-2,3-seco-allo-yohimbane 16β-carboxylic acid lower alkoxy-lower alkyl, for example, by treatment with a carboxylic acid halide, e.g. acetyl chloride, 3,4,5-trimethoxy-benzoyl chloride, 4-ethoxycarbonyloxy-3,5-trimethoxybenzoyl chloride, 3,4,5-trimethoxy-cinnamoyl chloride or any other suitable carboxylic acid halide, or with a carboxylic acid anhydride, e.g. acetic acid anhydride and the like, in the presence of an organic base, e.g. pyridine and the like, and ring-closing the resulting 18α-acylated hydroxy-3-oxo-2,3-seco-allo-yohimbane 16β-carboxylic acid lower alkoxy-lower alkyl ester by treatment with a ring closing reagent, e.g. phosphorus oxychloride and the like. Hydrolysis, re-esterification and ring-closure are carried out according to known methods.

A compound resulting from the above procedure may be in the form of the free base or as a salt thereof. Conversion of the latter into the free compound may be carried out as previously shown, and a salt may be formed, for example, by treatment of a solution of the free base in a suitable inert solvent with the appropriate acid, and isolation of the desired salt, which may be recovered in the form of a hydrate.

The invention also comprises any modification of the process wherein a compound obtainable as an intermediate at any state of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as preferred embodiments of the invention.

This is a continuation-in-part application of our application Serial No. 110,323, filed May 16, 1961, now abandoned, which in turn is a continuation-in-part application of our application Serial No. 73,558, filed December 5, 1960, now abandoned, which in turn is a continuation-in-part application of our application Serial No. 46,884, filed August 2, 1960.

The following example illustrates the invention and is not to be construed as being a limitation thereon. Temperatures are given in degrees centigrade.

*Example*

To a solution of 2.0 g. of 2-methoxyethyl 18-epi-reserpate in 40 ml. of acetic acid and 80 ml. of water is added 0.72 g. of potassium dichromate in 40 ml. of water. The reaction mixture is allowed to stand at room temperature for one hour, and is then diluted with water and made basic with aqueous ammonia. The organic material is extracted with methylene chloride, the extract is dried over sodium sulfate and evaporated to dryness. 1.9 g. of crude 2-methoxyethyl 3-dehydro-18-epi-reserpate of the formula:

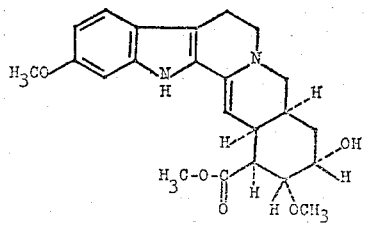

is recovered, crystallized from methanol and recrystallized from a mixture of methanol and petroleum ether to give the hemihydrate, M.P. 170–174°; $[\alpha]_D^{25} = +125°$ (in chloroform).

The solvent from a solution of 0.275 g. of 2-methoxyethyl 3-dehydro-18-epi-reserpate and 0.66 ml. of 1 N aqueous hydrochloric acid in 15 ml. of water is removed by lyophylization; the desired 2-methoxyethyl 3-dehydro-18-epi-reserpate chloride is dried to contain 2½ mols of water, M.P. 62–66°, yield: 0.275 g.

The starting material used in the above procedure may be prepared as follows:

A mixture of 9.6 g. of 2-methoxyethyl reserpate, 6.0 g. of 3-nitro-benzene sulfonic acid chloride and 15 ml. of pyridine is prepared at 0°, and is allowed to stand at 5° overnight and at room temperature for three hours. The reaction mixture is poured into 600 ml. of water containing 4.5 ml. of N,N,N-triethylamine and 10 ml. of aqueous ammonia. The granular solid is filtered off, washed with water and dissolved in methylene chloride. The organic solution is filtered through a column containing a diatomaceous earth preparation, the solvent is evaporated, and the residue is dissolved in a small amount of methylene chloride. The 2-methoxyethyl 18-O-(3-nitro-phenyl-sulfonyl)-reserpate crystallizes upon concentrating the solution until crystallization begins and then adding a 50 percent excess of diethyl ether and is purified by washing with diethyl ether, M.P. 152–156°.

A mixture of 5.0 g. of 2-methoxyethyl 18-O-(3-nitro-phenyl-sulfonyl)-reserpate, 1.2 of N,N,N-triethylamine and 40 ml. of water in 118 ml. of p-dioxane is refluxed gently under an atmosphere of nitrogen for five days. The solvents are evaporated, the residue is dissolved in 200 ml. of 5 percent aqueous hydrochloric acid, and the acid solution is treated with aqueous ammonia. The resulting precipitate is filtered off, washed with water, dried and crystallized from ethyl acetate. The desired 2-methoxyethyl 18-epi-reserpate is recrystallized from ethyl acetate, M.P. 168–170°, $[\alpha]_D^{24} = -69°$ (chloroform).

Other compounds of this invention, which may be prepared according to the previously described procedure, are, for example, 2-ethoxyethyl 3-dehydro-18-epi-reserpate, 2-n-propyloxyethyl 3-dehydro-18-epi-reserpate, 2-methoxypropyl 3-dehydro-18-epi-reserpate, 3-methoxypropyl 3-dehydro-18-epi-reserpate, 2-methoxyethyl 3-dehydro-18-epi-deserpidate, 2-methoxyethyl 10-methoxy-3-dehydro-18-epi-deserpidate and the like, or pharmaceutically acceptable salts thereof, may be prepared according to the previously described procedure.

What is claimed is:

1. A member selected from the group consisting of a compound of the formula

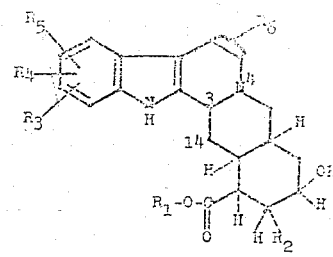

in which $R_1$ represents lower alkoxy-lower alkyl, in which lower alkyl separates lower alkoxy from the 16β-carboxyl group by at least two carbon atoms, $R_2$ stands for a member selected from the group consisting of lower alkoxy and cyano, each of the groups $R_3$, $R_4$ and $R_5$ stands for a member selected from the group consisting of hydrogen, lower alkyl, lower alkoxy, halogeno, lower alkyl-mercapto, and whenever two of the groups $R_3$, $R_4$ and $R_5$ are taken together, lower alkylenedioxy, and $R_6$, attached to one of the positions 5 and 6, is a member selected from the group consisting of hydrogen and lower alkyl, and in which a double bond extends from the 3-position to the 14-position, and a salt thereof, in which a double bond extends from the 3-position to the 4-position, and in which the anion is that of a pharamceutically acceptable acid.

2. Lower alkoxy-lower alkyl 3(14)-dehydro-18-epi-reserpate, in which lower alkyl separates lower alkoxy from the 16β-carboxyl group by two to three carbon atoms.

3. 2-methoxyethyl 3(14)-dehydro-18-epi-reserpate.

4. 2-methoxyethyl 3(4)-dehydro-18-epi-reserpate chloride.

5. A salt of lower alkoxy-lower alkyl 3(4)-dehydro-18-epi-reserpate, in which lower alkyl separates lower alkoxy from the 16β-carboxyl group by two to three carbon atoms, and in which the anion is that of a pharmaceutically acceptable acid.

6. A salt of 2-methoxyethyl 3(4)-dehydro-18-epi-reserpate, in which the anion is that of a pharmaceutically acceptable acid.

References Cited in the file of this patent

UNITED STATES PATENTS

| | | |
|---|---|---|
| 2,877,225 | Taylor | Mar. 10, 1959 |
| 2,977,365 | Weisenborn et al. | Mar. 28, 1961 |
| 2,995,556 | Lucas | Aug. 8, 1961 |
| 3,022,311 | Weisenborn et al. | Feb. 20, 1962 |

OTHER REFERENCES

The "Chemical Age" Chem. Dict., Benn Ltd., London, 1924, page 89.

Theilheimer: Syn. Methods of Org. Chem., vol. 9 (1955), page 407.

Wenkert et al.: Jour. Amer. Chem. Soc., vol. 79 (1957), pages 1519 and 1520.